Jan. 10, 1967  J. A. TAPLESHAY  3,297,567
METHOD AND APPARATUS FOR TREATING SEWAGE
Filed June 21, 1962

Inventor
John A. Tapleshay
By Schneider, Dressler, Goldsmith & Clement, Attys.

United States Patent Office 3,297,567
Patented Jan. 10, 1967

3,297,567
METHOD AND APPARATUS FOR
TREATING SEWAGE
John A. Tapleshay, Sandy Springs, Ga., assignor to FMC
Corporation, a corporation of Delaware
Filed June 21, 1962, Ser. No. 204,140
4 Claims. (Cl. 210—14)

This invention relates to a method and apparatus for treating sewage, and is particularly concerned with means for removing liquid sewage, together with sewage solids to be subsequently treated, from a grit tank without removing grit larger than a predetermined size along with the liquid sewage.

Heretofore the removal of sewage solids from the grit tank depended upon the circulation of the sewage induced by air forced into the sewage near one end of the tank. As disclosed in Morgan et al. Patent No. 2,532,457, the rate of introduction of air into the tank is controlled so that the circulation of the sewage in the tank will permit grit and other solids to settle out while the lighter organic solids are kept in circulation in the tank. The circulating liquid containing the lighter organic matter in suspension continuously flows over an effluent weir. The circulation of the liquid sewage serves to wash the organic matter from the grit so that the sewage is more thoroughly treated and the grit is less offensive when it is removed from the tank.

In accordance with the present invention the grit tank is divided into two sections by a baffle having its lower edge spaced from the tank bottom and having its upper edge extend above the liquid level of the tank. The total amount of sewage that flows over the effluent weir depends upon the amount of raw sewage that flows into the grit tank, but the rate at which it flows upwardly through the baffled section depends upon the area between the baffle and the adjacent wall of the tank parallel to the baffle. The rate of flow is independent of the velocity of circulation of the liquid induced by injection of air into the sewage. This arrangement allows a greater variation of air input into the grit tank without adversely affecting grit removal, allows better control of the flow of sewage over the effluent weir of the grit tank so as to retain grit of a specific particle size in the tank for subsequent removal, and allows the grit to be washed more efficiently.

The baffle is spaced from the adjacent wall of the grit tank such a distance that the rising velocity of the upflow through the baffled section of the tank will not exceed the subsidence velocity of the grit particles to be removed. The particle size of the grit that is left in the grit tank for subsequent mechanical removal may be controlled by the spacing between the baffle and the adjacent wall of the tank. If the upflow velocity through the baffle section is so great that the sewage flowing over the effluent weir carries with it grit having a particle size large enough to deleteriously affect the subsequent treatment of the solids, the baffle may be spaced farther from the adjacent parallel wall of the tank. The velocity of the upward flow of sewage in the baffled section of the tank decreases as the baffle is moved away from the adjacent parallel wall. The baffle is positioned so that the sewage flowing upwardly into the effluent channel will not carry with it grit particles large enough to interfere with the subsequent treatment of the sewage.

The structure by means of which the above mentioned and other advantages are attained will be described in the following specification taken in conjunction with the accompanying drawing, showing a preferred illustrative embodiment of the invention, in which.

Figure 1:
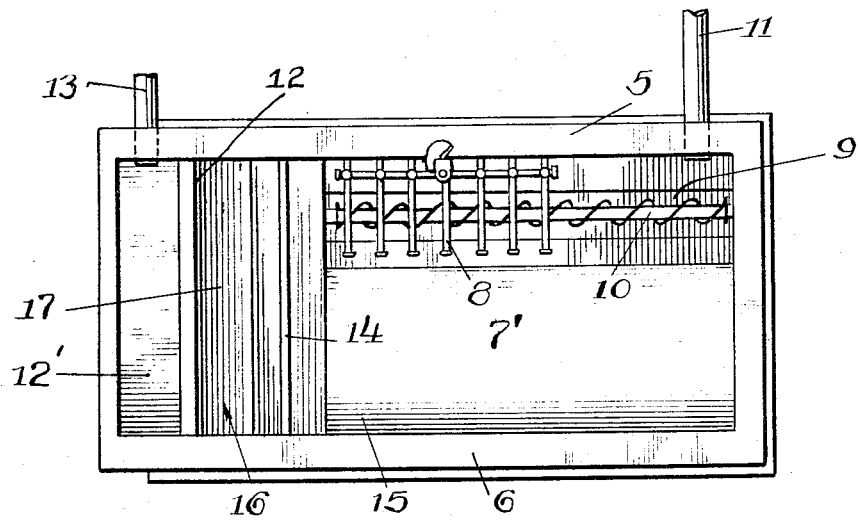
FIGURE 1 is a top plan view of a grit tank embodying the invention.
Figure 2:
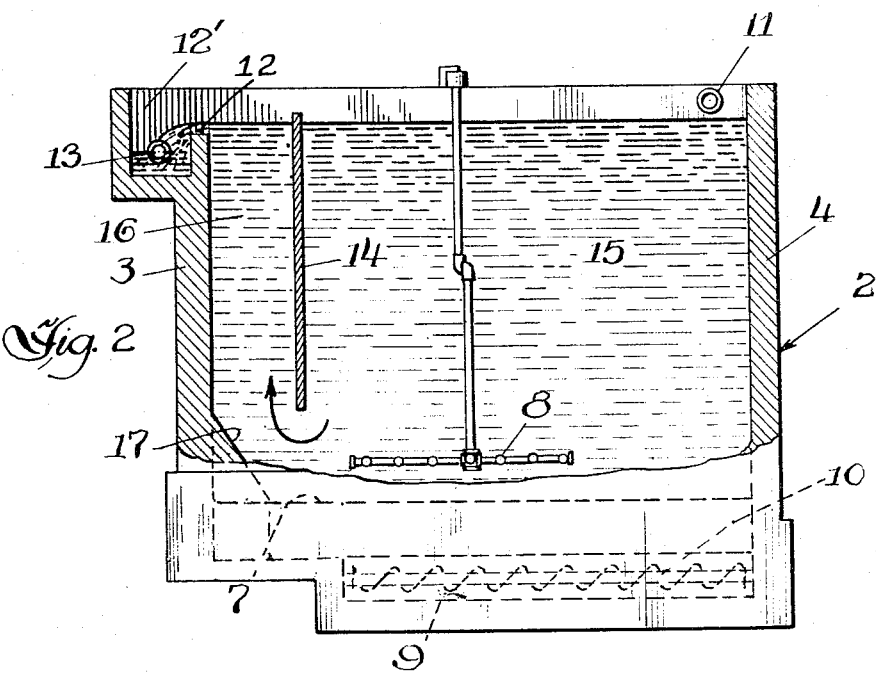
FIGURE 2 is a front elevational view of the tank with the upper portion broken away for clarity.

Referring to the drawings, a grit tank 2 having side walls 3, 4, 5 and 6, is provided with a floor 7 and one or more diffusers 8 for introducing air into the sewage. The diffuser is conventional and will not be described in detail. The introduction of air into the sewage adjacent one end of the tank causes a circulatory movement of the sewage in the tank about a horizontal axis parallel to the side wall 5. During this circulatory movement of the sewage the organic matter is washed from the grit. The larger particles of grit fall to the floor of the tank. The floor 7 slopes toward a trough 9 as indicated at 7'. Trough 9 extends parallel to wall 5 below the level at which the air is introduced into the tank and is shorter than wall 5. The trough extends from wall 4 to a point short of wall 3. The portion of floor 7 adjacent wall 3 is sloped, as indicated at 17. The sloping surface 17 is directly below section 16 and extends entirely across the tank between walls 5 and 6. The heavier particles of grit gravitate toward the trough 9 and are washed substantially free of organic solid matter by the time they reach the trough. The organic matter is also washed from the smaller particles of grit that may remain in suspension in the liquid sewage.

A screw conveyor 10, positioned in the trough 9, is adapted to move all the grit accumulated in the trough toward one end of said trough from which it may be moved by any suitable means. The screw conveyor may be omitted, and the grit may be removed from the tank 2 in any suitable manner.

Raw sewage enters the tank through an inlet 11 near the upper edge of the wall 5 and flows over an effluent weir 12 and into an effluent channel 12' which leads to an outlet 13. Effluent channel weir 12 extends along the upper edge of wall 3. As raw sewage flows into the tank from the inlet 11 an equal amount of sewage flows over the effluent weir and into the effluent channel, and is carried through outlet 13 to other tanks for subsequent treatment.

A baffle 14 extending parallel to the effluent weir divides the tank into two sections 15 and 16. The lower edge of the baffle is spaced above the surface of floor 7 and its upper edge extends above the liquid level of the tank. The baffle extends all the way from wall 5 to wall 6, and the only way any of the sewage can flow over the effluent weir is through the space between the baffle and wall 3. The baffle effectively separates the sections 15 and 16 so that the sewage in section 16 is not affected by the circulatory motion of the sewage in section 15. Thus the grit will not be carried over the effluent weir regardless of the velocity of the circulatory movement of the sewage in section 15, and air may be forced into section 15 at a rate sufficient to wash substantially all of the organic matter from the grit.

The only grit that is carried into section 16 is the grit that remains in suspension in the liquid sewage that flows under the bottom of the baffle. As the sewage flows upwardly through section 16 some of the grit that is in suspension will fall to the bottom of the tank. The slope of surface 17 causes grit settling in section 16 to gravitate toward the section of floor 7 in transverse alignment with trough 9. The grit moves along the floor of the tank and is not interfered with by the flow of liquid sewage under baffle 14, although the movements of the grit and the liquid sewage are in opposite directions, because the liquid sewage flows above the grit and is not turbulent enough as it passes under baffle 14 and upwardly in section 16 to lift the grit from the floor of the tank. The slope of surface 7' causes the grit that has settled on the floor of the tank to move toward the trough 9. The tank is designed to remove grit of a certain particle size from the liquid sewage. The rate at which sewage flows upwardly through section 16 is determined by the cross sectional area of section 16. If grit having a particle size in excess of the size intended to be removed is carried upwardly with the sewage flowing upwardly through section 16 the upward flow velocity is too great. This velocity can be reduced by spacing the baffle farther from wall 3. The width of section 16, that is the distance between baffle 14 and wall 3, is increased until the rising velocity of upflow through the section is no greater than the subsidence velocity of the grit particles to be removed.

Although I have described a preferred embodiment of the invention in considerable detail, it will be understood that the description thereof is intended to be illustrative, rather than restrictive, as many details of structure may be modified or changed without departing from the spirit or scope of the invention. Accordingly, I do not desire to be restricted to the exact construction described.

I claim:

1. A method of removing grit of a particular particle size from liquid sewage in a tank, said sewage containing relatively light organic matter, heavier but relatively light particles of grit, and relatively heavy particles of grit, said method comprising the steps of positioning a baffle in said tank parallel to one wall of said tank to divide it into a first section having an inlet and a second section having an outlet, whereby sewage entering said first section must flow under said baffle and upwardly in said second section to reach said outlet, forcing air into the sewage in said first section at a plurality of points along a line normal to said baffle to move said sewage in a circulatory path within said first section about a horizontal axis normal to said baffle and to cause said heavy grit to settle out of said sewage to the floor of said first section, moving said heavy grit along the floor of said first section to a disposal trough, flowing sewage, from which said heavy grit has settled, from said first section under said baffle and then upwardly in said second section and controlling the upflow velocity of said sewage in said second section by regulating the spacing of said baffle from the parallel wall of said tank to keep the upflow velocity of sewage in said second section from exceeding the subsidence velocity in said second section of grit of the particular particle size.

2. A method of treating raw sewage containing relatively light organic matter, heavier but relatively light particles of grit, and relatively heavy particles of grit, said method comprising the steps of flowing the raw sewage into one section of a tank, forcing air into said sewage to move it in a circulatory path about a horizontal axis within said tank section, thereby causing the relatively heavy particles of grit to settle to the floor of said tank section while maintaining the relatively light organic matter and heavier but relatively light particles of grit in suspension in the sewage, moving said relatively heavy particles of grit along the floor of said one tank section to a disposal trough, flowing the sewage from which the relatively heavy particles of grit have been removed as aforesaid in a direction parallel to said horizontal axis and under and normal to a baffle spaced adjacent the floor of the tank and into a quiescent zone, flowing said sewage upwardly through said quiescent zone to an outlet at a rate which permits the said relatively light particles of grit to settle therefrom and flowing the said sewage containing the aforesaid relatively light organic matter out from the tank.

3. A tank for treatment of raw sewage containing relatively light organic matter, heavier but relatively light particles of grit, and relatively heavy particles of grit, said tank comprising a floor, a plurality of upright walls, a baffle extending completely across said tank parallel to one of said upright walls to divide said tank into a first section and a second section, an inlet in said first section for flowing raw sewage into said first section, a plurality of air diffusers in said first section positioned in a line normal to the plane of said baffle and arranged to force air into the raw sewage near the floor of said first section to move the sewage in said first section in a circulatory path about a horizontal axis normal to the plane of said baffle, whereby the relatively heavy particles of grit in said sewage settle on the floor of said first section, said baffle having its lower edge spaced adjacent said floor to provide an exit from said first section to said second section and its upper edge extending above the maximum liquid level of said tank to provide a quiescent zone in said second section, and an outlet near the upper edge of said second section, whereby raw sewage flowing into said first section moves sewage, from which said relatively heavy particles of grit have settled, under said baffle and upwardly through said quiescent zone to said outlet, said baffle being positioned at such a distance from the closest wall parallel thereto as to limit the rate of flow of the sewage flowing upwardly through said quiescent zone to such a rate that the relatively light particles of grit settle to the floor of said second section as the sewage containing the relatively light organic matter flows through said outlet.

4. A tank for treatment of raw sewage containing relatively light organic matter, heavier but relatively light particles of grit, and relatively heavy particles of grit, said tank comprising a floor, a plurality of upright walls, a baffle extending completely across said tank parallel to one of said upright walls to divide said tank into a first section and a second section, an inlet in said first section for flowing raw sewage into said first section, a plurality of air diffusers located in said first section near the floor and adjacent one side thereof in a line normal to the plane of said baffle, said diffusers being arranged to force air into the raw sewage near the floor of said first section to move the sewage in said first section in a circulatory path about a horizontal axis normal to the plane of said baffle, whereby the relatively heavy particles of grit in said sewage settle on the floor of said first section, said baffle having its lower edge spaced adjacent said floor to provide an exit from said first section to said second section and its upper edge extending above the maximum liquid level of said tank to provide a quiescent zone in said second section, an outlet near the upper edge of said second section, the flow of raw sewage into said first section moving sewage, from which said relatively heavy particles of grit have settled, under said baffle and upwardly through said quiescent zone to said outlet, said baffle being positioned at such a distance from the closest wall parallel thereto as to limit the rate of flow of the sewage flowing upwardly through said quiescent zone to such a rate that the relatively light particles of grit settle to the floor of said second section as the sewage containing the relatively light organic matter flows through said outlet, and a grit trough in said first section extending normal to the plane of said baffle, the floor of said first section sloping downwardly toward said trough and the floor of said second section sloping downwardly toward the floor of said first section, whereby grit settling from said sewage is moved downwardly toward said trough.

(References on following page)

References Cited by the Examiner

UNITED STATES PATENTS

| | | | |
|---|---|---|---|
| 2,090,813 | 8/1937 | Schumacher | 210—84 X |
| 2,126,228 | 8/1938 | Streander | 210—220 |
| 2,425,932 | 8/1947 | Green et al. | 210—84 |
| 2,428,756 | 10/1947 | Lind | 210—525 |
| 2,532,457 | 12/1950 | Morgan et al. | 261—124 |
| 2,852,140 | 9/1958 | MacLaren | 210—221 |
| 3,004,672 | 10/1961 | Conley et al. | 210—525 |
| 3,054,602 | 9/1962 | Proudman | 261—124 X |
| 3,133,017 | 5/1964 | Lambeth | 261—124 X |
| 3,215,276 | 11/1965 | Lind et al. | 210—220 X |

SAMIH N. ZAHARNA, *Primary Examiner.*

REUBEN FRIEDMAN, *Examiner.*

J. DE CESARE, *Assistant Examiner.*